United States Patent [19]

Bamberger

[11] 4,313,925
[45] Feb. 2, 1982

[54] THERMOCHEMICAL CYCLIC SYSTEM FOR DECOMPOSING $H_2O$ AND/OR $CO_2$ BY MEANS OF CERIUM-TITANIUM-SODIUM-OXYGEN COMPOUNDS

[75] Inventor: Carlos E. Bamberger, Oak Ridge, Tenn.

[73] Assignee: The United States of America as represented by the United States Department of Energy, Washington, D.C.

[21] Appl. No.: 143,253

[22] Filed: Apr. 24, 1980

[51] Int. Cl.$^3$ .................... C01B 3/04; C01G 23/00
[52] U.S. Cl. .................. 423/263; 423/415 A; 423/579; 423/648 R
[58] Field of Search ............. 423/263, 598, 648, 657; 252/462

[56] References Cited

U.S. PATENT DOCUMENTS 4,230,682  10/1980  Bamberger ............... 463/648 R X
4,237,105  12/1980  Bamberger et al. ........ 423/648 R X

OTHER PUBLICATIONS

Chem. Abst. vol. 66, 1967; p. 8741g.

Roy, R. "Journ. Am. Ceram. Soc.", vol. 37, 12/1954; pp. 581–584.

*Primary Examiner*—G. O. Peters
*Attorney, Agent, or Firm*—Fred O. Lewis; Stephen D. Hamel; Richard G. Besha

[57] ABSTRACT

A thermochemical closed cyclic process for the decomposition of water and/or carbon dioxide to hydrogen and/or carbon monoxide begins with the reaction of ceric oxide ($CeO_2$), titanium dioxide ($TiO_2$) and sodium titanate ($Na_2TiO_3$) to form sodium cerous titanate ($NaCeTi_2O_6$) and oxygen. Sodium cerous titanate ($NaCeTi_2O_6$) reacted with sodium carbonate ($Na_2CO_3$) in the presence of steam, produces hydrogen. The same reaction, in the absence of steam, produces carbon monoxide. The products, ceric oxide and sodium titanate, obtained in either case, are treated with carbon dioxide and water to produce ceric oxide, titanium dioxide, sodium titanate, and sodium bicarbonate. After dissolving sodium bicarbonate from the mixture in water, the remaining insoluble compounds are used as starting materials for a subsequent cycle. The sodium bicarbonate can be converted to sodium carbonate by heating and returned to the cycle.

8 Claims, 2 Drawing Figures

THERMOCHEMICAL CYCLIC SYSTEM FOR DECOMPOSING H₂O AND/OR CO₂ BY MEANS OF CERIUM-TITANIUM-SODIUM-OXYGEN COMPOUNDS

BACKGROUND OF THE INVENTION

This invention is a result of a contract with the U.S. Department of Energy. It relates generally to the art of thermochemical hydrogen production.

Hydrogen is considered to be an attractive energy source for development to replace fossil fuels, which are being consumed rapidly and becoming increasingly expensive. The combustion of hydrogen produces no obnoxious products and therefore causes no insult to the environment.

Technology is presently available for adapting existing energy transport means and consuming equipment for hydrogen utilization. Natural gas pipelines, for example, can be converted to hydrogen-carrying pipelines with minor modifications. Experimental automobiles, with modified conventional internal combustion engines, can use hydrogen for fuel.

As the prospect of hydrogen utilization becomes increasingly likely, methods for producing hydrogen need to be upgraded and increased. The conventional source of hydrogen has been electrolysis of water. Electrolysis, however, is highly inefficient owing to a maximum efficiency below 40% for electricity production coupled with a maximum efficiency of about 80 percent for electrolysis. Electrolytic production of hydrogen is limited by the overall futility of using one energy source, typically fossil fuels, at the point of electricity production to produce hydrogen at the point of electrolysis. The disadvantages of using irreplaceable fossil fuels are obviously not overcome by such a process.

Chemically feasible processes for the direct conversion of fossil fuels and water to hydrogen are available and overcome many of the inefficiencies and disadvantage of electrolysis. However, prudence dictates that fossil fuel consumption should be minimized and the fuels conserved for use as chemical intermediates.

Thermochemical processing is therefore a most attractive alternative method for producing hydrogen. By this technique, water is broken down to hydrogen and oxygen in a series of chemical reactions not requiring the use of fossil fuels. A given series of reactions is preferably carried out in a closed cyclic manner in which all products except hydrogen and oxygen are recycled as reactants. One such process, disclosed by Grimes et al in U.S. Pat. No. 3,919,406, involves the reaction of copper and magnesium chlorides with water to produce hydrogen in cyclic manner.

Another such process is disclosed by Bamberger et al in U.S. Pat. No. 3,927,192. The process therein disclosed comprises reacting chromium oxide with an alkali metal hydroxide to produce hydrogen, water and alkali metal chromate as reaction products.

Bamberger et al (U.S. Pat. No. 3,929,979) also disclose a cyclic process for splitting water, wherein magnetite is reacted with an alkali metal hydroxide to give hydrogen, alkali metal ferrate and water as products.

Bamberger et al, in U.S. Pat. No. 3,996,343, disclose the production of hydrogen in a closed chemical cycle for the thermal decomposition of water by reaction of water with chromium sesquioxide and strontium oxide.

Bamberger et al (U.S. Pat. No. 4,005,184) employ chromium and barium compounds in a thermochemical process for producing hydrogen using barium and chromium compounds.

A process for producing hydrogen in a closed thermochemical fashion from copper and barium compounds is set forth in commonly assigned application, Ser. No. 934,664, filed on Aug. 17, 1978.

It has also been proposed in commonly assigned application Ser. No. 934,768, filed on Aug. 17, 1978, to produce hydrogen from water using cobalt and barium compounds.

The reaction of cerium compounds with sodium phosphate and sodium carbonate in a thermochemical cycle for producing hydrogen from water or carbon monoxide from carbon dioxide is set forth in commonly assigned application Ser. No. 50,379, filed on June 20, 1979.

It has also been proposed in commonly assigned application Ser. No. 47,447, filed on June 11, 1979, to produce hydrogen thermochemically in a cyclical process using cerium-oxygen-titanium compounds.

OBJECTS OF THE INVENTION

An object of any thermochemical process is the direct use of heat from an energy producing facility requiring no fossil fuels, e.g., a nuclear reactor or a solar source.

It is a further object of this invention to provide a novel cyclic thermochemical process for splitting water into hydrogen and oxygen. In addition, this invention provides a novel thermochemical route for the production of carbon monoxide.

A further object of this invention is to provide a thermochemical route to hydrogen or carbon monoxide, carried out using reactants and reaction products which are markedly less corrosive than used in previously known processes, which employs abundant and inexpensive materials and which is simpler than known processes because the cyclic system operates efficiently regardless of minor cross contamination and, therefore, does not require complete separation of reactants or products.

These and other objects are accomplished in a three-step process in the first step of which ceric oxide, titanium dioxide and sodium titanate are reacted to produce sodium cerous titanate and oxygen.

SUMMARY OF THE INVENTION

In one aspect, this invention relates to a cyclic process for the production of hydrogen from water comprising the steps of:

(a) reacting ceric oxide, titanium dioxide and sodium titanate at a temperature above 900° C. to cause formation of sodium cerous titanate and oxygen;

(b) reacting thus-produced sodium cerous titanate with steam and one of sodium carbonate and sodium bicarbonate at a temperature above 500° C. to produce ceric oxide, sodium titanate, carbon dioxide and hydrogen, which is removed from the reaction environment;

(c) reacting sodium titanate produced in step (b) with water and carbon dioxide to produce titanium dioxide and sodium bicarbonate and removing the thus-produced sodium bicarbonate; and (d) recycling ceric oxide produced in step (b), titanium dioxide produced in step (c) and sodium titanate remaining from step (b) to step (a).

In another aspect, the invention relates to a cyclic process for the production of hydrogen from water comprising the steps of:

(a) reacting cerium oxide, titanium dioxide and sodium titanate at a temperature above 900° C. to cause formation of sodium cerous titanate and oxygen;

(b) reacting the thus-produced sodium cerium titanate with molten alkali-metal hydroxide to form ceric oxide, an alkali metal titanate, water, and hydrogen, which is removed from the reaction environment;

(c) reacting incompletely sodium titanate produced in step (b) with boiling water to produce sodium hydroxide and titanium dioxide, and removing the thus-produced sodium hydroxide; and (d) recycling ceric oxide produced in step (b), titanium dioxide produced in step (c) and sodium titanate remaining from step (c) to step (a).

In another aspect, this invention relates to a cyclic process for the production of carbon monoxide comprising the steps of:

(a) reacting ceric oxide, titanium dioxide and sodium titanate at a temperature above 900° C. to cause formation of sodium cerous titanate and oxygen;

(b) reacting thus-produced sodium cerous titanate with one of sodium carbonate and sodium bicarbonate at a temperature above 900° C. to produce ceric oxide, sodium titanate, carbon dioxide and carbon monoxide, which is removed from the reaction environment;

(c) reacting incompletely sodium titanate produced in step (b) with water and carbon dioxide to produce titanium dioxide and sodium bicarbonate; and removing the thus-produced sodium bicarbonate; and (d) recycling ceric oxide produced in step (b), sodium titanate remaining from step (c) and titanium dioxide produced in step (c) to step (a).

In addition, this invention relates to a method for producing sodium cerous titanate comprising reacting ceric oxide, titanium dioxide and sodium titanate at a temperature above 900° C. to cause the formation of sodium cerous titanate and oxygen.

This invention further relates to a method for producing hydrogen comprising reacting sodium cerous titanate, sodium carbonate and steam at a temperature above 500° C. to produce ceric oxide, sodium titanate, carbon dioxide and hydrogen and further to a method for producing carbon monoxide comprising heating sodium cerous titanate and sodium carbonate at a temperature above 900° C. to form carbon monoxide, carbon dioxide, ceric oxide and sodium titanate.

DETAILED DESCRIPTION

Figure 1:
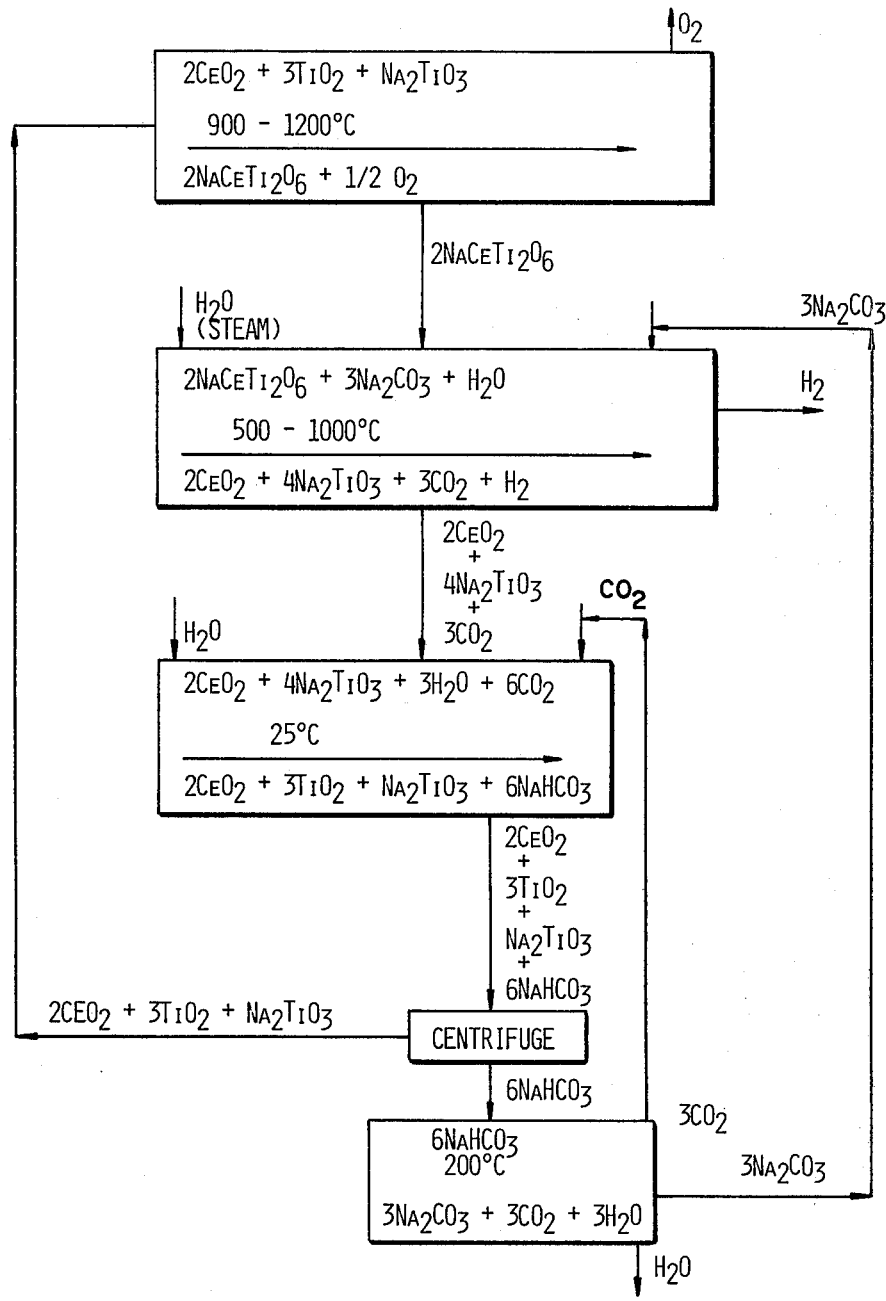
In FIG. 1 is given a schematic representation of a preferred embodiment of a cyclic thermochemical process for the production of hydrogen.
Figure 2:
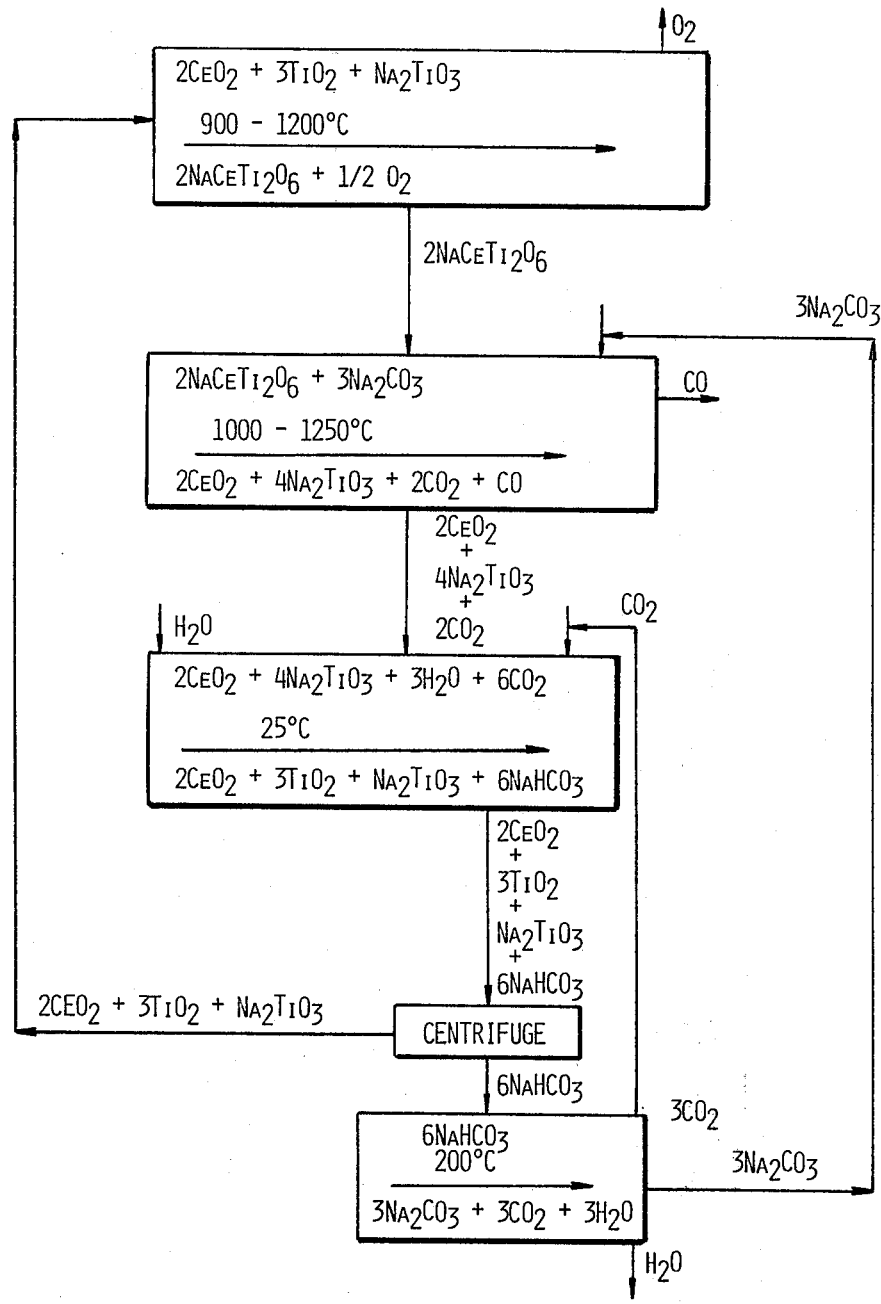
In FIG. 2 is given a schematic representation of a preferred embodiment of a cyclic thermochemical process for the production of carbon monoxide.

The formation of sodium cerous titanate can be represented by the chemical equation:

$$2CeO_2 + 3TiO_2 + Na_2TiO_3 \rightarrow 2NaCeTi_2O_6 + \tfrac{1}{2}O_2 \qquad (a)$$

The reaction is conveniently carried out using an inert gas, such as argon, as carrier for the oxygen produced by the reaction. The oxygen evolved in this reaction can be measured continuously in the argon effluent stream by a Beckman Oxygen Analyzer. Significant evolution of oxygen begins at a temperature of about 900° C. Oxygen evolution continues until the temperature reaches about 1200° C., but maximum oxygen pressure is observed near about 1100° C. It is therefore preferred to carry out this step at 900°–1200° C.

When hydrogen is the desired product, the reaction of sodium cerous titanate with sodium carbonate and water can be represented by the chemical equation:

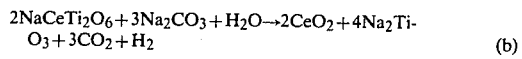

$$2NaCeTi_2O_6 + 3Na_2CO_3 + H_2O \rightarrow 2CeO_2 + 4Na_2TiO_3 + 3CO_2 + H_2 \qquad (b)$$

The reaction is carried out by passing steam over the solid reactants. Preferably, an inert gas such as argon is used as a carrier for the steam and gaseous products. It is preferred to use a stream of steam and argon, that has been preheated to about 300° C. The exit gases are passed through a condenser to condense the steam and remove it as water. The amount of hydrogen evolved can be measured continuously by thermal conductivity. Significant evolution of hydrogen takes place between 500° C. and 1000° C., which is the preferred temperature range for the reaction.

Regeneration of titanium dioxide and sodium titanate from the products of the foregoing reaction can be represented by the chemical equation:

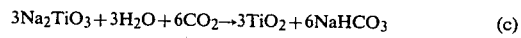

$$3Na_2TiO_3 + 3H_2O + 6CO_2 \rightarrow 3TiO_2 + 6NaHCO_3 \qquad (c)$$

The solid products of the previous step, including ceric oxide, which is carried along but does not undergo further reaction in this step, are treated with water and carbon dioxide at ambient conditions (about 25° C.). The $NaHCO_3$ produced is removed from the product by dissolution in water; $CeO_2$, $TiO_2$ and $Na_2TiO_3$ are returned as starting materials to the first step of the cycle. The $NaHCO_3$ can be recovered by crystallization, converted to $Na_2CO_3$ by heating at about 200° C. and recycled to the second step of the cycle.

The overall reaction sequence for thermochemical production of hydrogen is therefore:

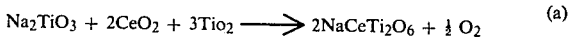

$$Na_2TiO_3 + 2CeO_2 + 3TiO_2 \rightarrow 2NaCeTi_2O_6 + \tfrac{1}{2}O_2 \qquad (a)$$

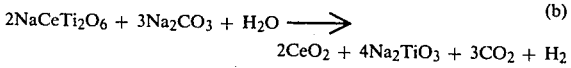

$$2NaCeTi_2O_6 + 3Na_2CO_3 + H_2O \rightarrow 2CeO_2 + 4Na_2TiO_3 + 3CO_2 + H_2 \qquad (b)$$

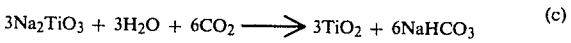

$$3Na_2TiO_3 + 3H_2O + 6CO_2 \rightarrow 3TiO_2 + 6NaHCO_3 \qquad (c)$$

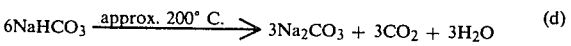

$$6NaHCO_3 \xrightarrow{\text{approx. 200° C.}} 3Na_2CO_3 + 3CO_2 + 3H_2O \qquad (d)$$

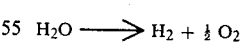

$$H_2O \rightarrow H_2 + \tfrac{1}{2}O_2$$

If desired, $NaHCO_3$ may be substituted for $Na_2CO_3$ in step (b).

When the cyclic process is to be utilized for the production of carbon monoxide, the second step can be represented by the chemical equation:

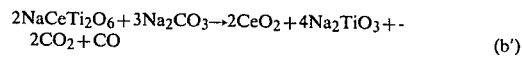

$$2NaCeTi_2O_6 + 3Na_2CO_3 \rightarrow 2CeO_2 + 4Na_2TiO_3 + 2CO_2 + CO \qquad (b')$$

Accordingly, the reaction for production of hydrogen will be modified by omission of steam. It is preferred for analytical reasons only, to use helium as inert carrier gas. The mixture exit gases will be passed through a Ba(OH)$_2$ solution and columns packed with Ascarite ® and Drierite to remove CO$_2$ and water and, finally, through a thermal conductivity cell to measure the concentration of CO in helium. The preferred temperature range for this reaction is 1000°–1250° C., with a minimum of 900° C. being operable.

In this aspect of the invention, the overall reaction sequence is therefore:

$$Na_2TiO_3 + 2CeO_2 + 3TiO_2 \longrightarrow 2NaCeTi_2O_6 + \tfrac{1}{2} O_2 \quad (a)$$

$$2NaCeTi_2O_6 + 3Na_2CO_3 \longrightarrow \\ 2CeO_2 + 4Na_2TiO_3 + 2CO_2 + CO \quad (b')$$

$$3Na_2TiO_3 + 3H_2O + 6CO_2 \longrightarrow 3TiO_2 + 6NaHCO_3 \quad (c)$$

$$6NaHCO_3 \longrightarrow 3Na_2CO_3 + 3CO_2 + 3H_2O \quad (d)$$

$$CO_2 \longrightarrow CO + \tfrac{1}{2} O_2$$

Carbon monoxide can be used to decompose water by the well-known water gas shift reaction: $CO + H_2O \rightarrow CO_2 + H_2$. The carbon monoxide and hydrogen produced by this process can be used as fuel for boilers, fuel cells, internal combustion engines, or to produce methanol and methane by methods well known and already in use in the chemical industry, e.g., the reaction: $CO + 2H_2 \rightarrow CH_4 + H_2O$.

Another aspect of the invention comprises the cyclic thermochemical process for producing hydrogen as follows:

$$2CeO_2 + 3TiO_2 + Na_2TiO_3 \rightarrow 2NaCeTi_2O_6 + \tfrac{1}{2}O_2 \quad (a)$$

$$2NaCeTi_2O_6 + 6NaOH \rightarrow 2CeO_2 + 4Na_2TiO_3 + 2H_2O + H_2 \quad (b)$$

$$3Na_2TiO_3 + 3H_2O \rightarrow 6NaOH + 3TiO_2 \quad (c)$$

Step (a) is common to the cycles discussed above and is illustrated in examples presented hereinafter. Step (b) is effected with molten NaOH; hydrogen starts evolving at 450°–550° C., reaching a maximum pressure at 600°–700° C. Step (c) preferably is effected with boiling water. The resulting NaOH solution is filtered off, and solid NaOH is recovered by evaporation of water. (Steps analogous to (b) and (c) are described in above-referenced Ser. No. 47,447). This cycle is not restricted to sodium carbonate, sodium bicarbonate, or sodium hydroxide; instead, the corresponding salts of other alkali metals (e.g., Li, and K) may be used.

The process herein disclosed is very versatile and permits production of hydrogen or carbon monoxide in a single cyclic process consisting of essentially three principle chemical reactions, each of which has been demonstrated to give yields of 90% or above. The compounds used and the reaction products are only mildly corrosive, which means that the high temperature reactions of this invention can be done in reactors built with less expensive materials than required heretofore. Minor cross contamination does not jeopardize efficient operation of the system, so that complete separation of the reactants is not absolutely essential. The compounds consumed are abundant and inexpensive. All of the solid reactants and products have very low vapor pressures and are unlikely to be lost by volatilization. A further advantage of the invention is that recovery of only one solute from solution in the final step is required.

DESCRIPTION OF PREFERRED EMBODIMENTS

In accordance with the practice of this invention, the most preferred process for making hydrogen will be that wherein ceric oxide, titanium dioxide and sodium titanate are heated at 900°–1200° C. to produce sodium cerous titanate and oxygen and wherein sodium cerous titanate and sodium carbonate are reacted at a temperature between 500° C. and 1000° C. with steam preheated to at least about 300° C. to produce ceric oxide, sodium titanate, carbon dioxide and hydrogen.

The most preferred process for making carbon monoxide will be that wherein ceric oxide, titanium dioxide and sodium titanate are heated at 900°–1200° C. to produce sodium cerous titanate and oxygen and wherein sodium cerous titanate and sodium carbonate are heated at 1000°–1250° C. to produce ceric oxide, sodium titanate, carbon dioxide and carbon monoxide.

Without further elaboration, it is believed that one skilled in the art can, using the preceding description, utilize the present invention to its fullest extent. The following preferred specific embodiments are, therefore, to be construed as merely illustrative and not limitative of the remainder of the disclosure in any way whatsoever. In the following Examples, the temperatures are set forth uncorrected in degrees Celsius. Unless otherwise indicated, all parts and percentages are by weight.

EXAMPLE 1

(a) A mixture of 4.4 g of pure CeO$_2$, 3.1 g of TiO$_2$ and 1.9 g of Na$_2$TiO$_3$ was placed in a platinum boat which was inserted into a fused quartz tube. The quartz tube containing the solid mixture was heated inside a tube furnace while the system was purged with a continuously flowing stream of argon at essentially 1 atm pressure. The temperature was increased at a rate of about 5° C./min. Evolved oxygen was carried with the argon stream into a continuously operating, calibrated Beckman Model 741 oxygen analyzer. Evolution of oxygen started at 900° C. and continued until the temperature reached 1215° C. Maximum oxygen pressure occurred at about 1100° C. The amount of oxygen evolved was 110 ml, corresponding to 70% reaction.

(b) A mixture of 4.5 g of pure CeO$_2$, 3.6 g of TiO$_2$, and 0.9 g of Na$_2$TiO$_3$ heated under the same conditions produced 146 ml of oxygen (91% reaction).

The solid products of each of the above reactions were characterized by x-ray diffraction and by neutron activation analysis. Products obtained in subsequent examples were characterized in the same way.

EXAMPLE 2

(a) A mixture of 9.6 g of NaCeTi$_2$O$_6$ and 4.7 g of Na$_2$CO$_3$ was placed in a platinum boat and inserted into a fused quartz tube. A tube furnace was used to heat the boat containing the mixture. A stream of argon and steam preheated to about 300° C. was continuously passed over the reaction boat while the temperature of the system was increased at a rate of about 5° C./min. The effluent gas stream was passed through a condenser so as to condense steam to water before passing the residual gases into a Gow-Mac model 20–150 thermal conductivity detector to monitor hydrogen evolution, which evolution started at a temperature of about 500° C. and continued to 1000° C. The amount of hydrogen evolved was 187 ml (99% yield).

(b) A similar test was performed using a mixture of 3 g of $NaCeTi_2O_6$ and 2.8 g of $Na_2CO_3$, with continuous flow of helium through the system. The exit gases were passed through a solution of $Ba(OH)_2$ to remove $CO_2$ and then through a column containing sodium hydrate-asbestos absorbent (Ascarite ®) and anhydrous calcium sulfate (Drierite) to remove traces of $CO_2$ and water and finally through the thermal conductivity detector. The evolution of carbon monoxide started at a temperature of 990° C. and continued to 1237° C. The volume of CO measured was 120 ml (97% completion of reaction).

EXAMPLE 3

(a) A mixture of 5.5 g of solid product from Example 2(a), containing $CeO_2$ and $Na_2TiO_3$, was added to 75 ml of water. Carbon dioxide was bubbled through the resulting slurry for 15 minutes at room temperature (about 25° C.), after which the solids were separated by centrifugation. This treatment was repeated twice with fresh portions of water. The solids were washed with acetone and dried in air.

(b) A mixture of 3.41 g of $CeO_2$, $TiO_2$, and $Na_2TiO_3$ isolated from Example 3(a) was heated as in Example 1. The amount of oxygen evolved between 1100° C. and 1190° C. was 28 ml (99% yield).

This example shows that material recovered from the thermochemical production of hydrogen can be used in subsequent cycles.

The preceding examples can be repeated with similar success by substituting the generically or specifically described reactants and/or operating conditions of this invention for those used in the preceding examples.

$NaCeTi_2O_6$ is the end member of a family of compounds with the general formula $$[Ce(III)Na_{(1-x)}Ce(IV)_{x/4}]Ti_2O_6$$

In the foregoing illustrations, the compounds are characterized by $0 < x < 0.76$.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A method for producing sodium cerous titanate comprising reacting ceric oxide, titanium dioxide and sodium titanate at a temperature above 900° C. to cause the formation of sodium cerous titanate and oxygen.

2. A method for producing hydrogen comprising reacting sodium cerous titanate, sodium carbonate and steam at a temperature above 500° C. to produce ceric oxide, sodium titanate, carbon dioxide and hydrogen.

3. The method of claim 2, wherein said steam is provided in the form of a mixture of steam and inert carrier gas, said mixture being preheated to at least 300° C.

4. A cyclic process for the production of hydrogen from water comprising the steps of:
(a) reacting ceric oxide, titanium dioxide and sodium titanate at a temperature above 900° C. to cause formation of sodium cerous titanate and oxygen;
(b) reacting thus-produced sodium cerous titanate with steam and one of sodium carbonate and sodium bicarbonate at a temperature above 500° C. to produce ceric oxide, sodium titanate, carbon dioxide and hydrogen, which is removed from the reaction environment;
(c) reacting sodium titanate produced in step (b) with water and carbon dioxide to produce titanium dioxide and sodium bicarbonate and removing the thus-produced sodium bicarbonate; and
(d) recycling ceric oxide produced in step (b), titanium dioxide produced in step (c) and sodium titanate remaining from step (c) to step (a).

5. The process of claim 4, wherein ceric oxide, titanium dioxide and sodium titanate are heated at 900°–1200° C. to produce sodium cerous titanate and oxygen.

6. The process of claim 4, wherein sodium cerous titanate and sodium carbonate are reacted at a temperature between 500° C. and 1000° C. with steam preheated to about 300° C. to produce ceric oxide, sodium titanate, carbon dioxide and hydrogen.

7. The process of claim 4, wherein ceric oxide, titanium dioxide and sodium titanate are heated at 900°–1200° C. to produce sodium cerous titanate and oxygen and wherein sodium cerous titanate and sodium carbonate are reacted at a temperature between 500° C. and 1000° C. with steam preheated to about 300° C. to produce ceric oxide, sodium titanate, carbon dioxide and hydrogen.

8. A cyclic process for the production of hydrogen from water comprising the steps of:
(a) reacting cerium oxide, titanium dioxide and sodium titanate at a temperature above 900° C. to cause formation of sodium cerous titanate and oxygen;
(b) reacting the thus-produced sodium cerium titanate with molten alkali-metal hydroxide to form ceric oxide, an alkali metal titanate, water, and hydrogen, which is removed from the reaction environment;
(c) reacting incompletely sodium titanate produced in step (b) with boiling water to produce sodium hydroxide and titanium dioxide, and removing the thus-produced sodium hydroxide; and
(d) recycling ceric oxide produced in step (b), titanium dioxide produced in step (c) and sodium titanate remaining from step (c) to step (a).

* * * * *